US010451466B2

(12) United States Patent
Cooper et al.

(10) Patent No.: US 10,451,466 B2
(45) Date of Patent: Oct. 22, 2019

(54) OIL SIGHT GLASS (71) Applicant: Des-Case Corporation, Goodlettsville, TN (US)

(72) Inventors: Jay Michael Cooper, Goodlettsville, TN (US); Eric Cooper Pride, Nashville, TN (US); Matthew L. Michel, Mt. Juliet, TN (US); Derek C. Keith, Portland, TN (US); Nikhil Rajkumar Gaikwad, Goodlettsville, TN (US)

(73) Assignee: Des-Case Corporation, Goodlettsville, TN (US)

( * ) Notice: Subject to any disclaimer, the term of this patent is extended or adjusted under 35 U.S.C. 154(b) by 132 days.

(21) Appl. No.: 15/698,826

(22) Filed: Sep. 8, 2017

(65) Prior Publication Data
US 2018/0073907 A1 Mar. 15, 2018

Related U.S. Application Data (60) Provisional application No. 62/385,790, filed on Sep. 9, 2016.

(51) Int. Cl.
*G01F 23/02* (2006.01)
(52) U.S. Cl.
CPC .................... *G01F 23/02* (2013.01)
(58) Field of Classification Search
CPC ........................................... G01F 23/02
USPC ............... 73/293, 323, 309, 305, 319
See application file for complete search history.

(56) References Cited

U.S. PATENT DOCUMENTS

| 5,743,135 A * | 4/1998 | Sayka | G01F 23/2922 250/577 |
| 6,333,512 B1 * | 12/2001 | Wirthlin | G01F 23/2925 250/577 |
| 7,066,024 B2 * | 6/2006 | Watchel | G01F 23/40 116/228 |
| 7,595,070 B2 | 9/2009 | Olansky et al. | |
| 8,316,653 B2 * | 11/2012 | Appler | F25B 45/00 62/77 |
| 8,878,682 B2 * | 11/2014 | Kenney | G01F 23/68 340/623 |
| 9,982,838 B2 * | 5/2018 | Fitch | F01M 11/0408 |
| 2003/0062324 A1 | 4/2003 | Abrams et al. | |
| 2005/0007253 A1 | 1/2005 | Denietolis et al. | |

(Continued)

FOREIGN PATENT DOCUMENTS

JP 2009511643 A 3/2009

OTHER PUBLICATIONS

Search Report and Written Opinion in International application No. PCT/US2017/050762, dated Dec. 28, 2017, 12 pp.

*Primary Examiner* — Nimeshkumar D Patel
*Assistant Examiner* — Jean F Morello
(74) *Attorney, Agent, or Firm* — Patterson Intellectual Property Law, P.C.; Ryan D. Levy; Mark A. Kilgore (57) ABSTRACT

The present disclosure relates, in one embodiment, to an oil sight apparatus. The oil sight may include a sight body with a chamber defined in the sight body. The chamber may include a top, a bottom, and a sidewall spanning from the top to the bottom. A separator may be located in the chamber. The separator may be configured to sink in oil and to float in water such that the separator may rest at an oil-water separation line in the chamber.

20 Claims, 6 Drawing Sheets

(56) References Cited

U.S. PATENT DOCUMENTS

2007/0039883 A1* 2/2007 Glynn .................... B01D 17/04
  210/636
2010/0269584 A1 10/2010 Horst
2014/0238156 A1 8/2014 Aljohani
2017/0297925 A1* 10/2017 Eberly ..................... C02F 1/40

* cited by examiner

OIL SIGHT GLASS

BACKGROUND

The present disclosure relates generally to an oil sight glass. More particularly, the present disclosure pertains to improvements in traditional oil sight glass devices.

The function of an oil sight glass is to provide visual confirmation of water and/or debris in oil. The oil may be stored in a reservoir, and the oil sight glass may be connected to the reservoir. Oil reservoirs may be used to feed gearboxes, hydraulic systems, and lubrication systems. Because of wear, water, particulates, heat, and other factors, the oil may become contaminated. This contamination may migrate to the reservoir and may settle at the bottom as sediment.

Traditional oil sight glasses are also referred to as bottom sediment and water bowls. These oil sight glasses include a drain at the bottom to aid in the evacuation of sediment or water from the bottom of the reservoir. The oil sight glass can be installed in either a horizontal or a vertical orientation. In many situations, the color of the oil and other factors make distinguishing between oil and water in the sight glass quite difficult.

What is needed, therefore, is an improved oil sight glass device to increase the visibility of oil, water, and other contaminants in a reservoir.

BRIEF SUMMARY

Briefly, the present disclosure relates, in one embodiment, to an oil sight glass. The oil sight glass may include a sight body with a chamber defined in the sight body. The chamber may include a top, a bottom, and a sidewall spanning from the top to the bottom. A separator may be located in the chamber. The separator may be configured to float in a first fluid and to sink in a second fluid such that the separator rests at an interface between the first fluid and the second fluid in the chamber.

The chamber bottom may include an opaque bottom section. At least some of the ambient light may reflect off of the opaque bottom section and into the chamber.

A majority of the chamber bottom may include the opaque bottom section.

An illumination source may be located nearer the chamber bottom than the chamber top.

The illumination source may be located below the chamber bottom opposite the chamber top.

The illumination source may be disposed at least partially within the chamber bottom.

The illumination source may be electrically connected to a remote light switch.

The chamber top may include a domed top. The domed top may prevent at least some exterior contaminants from resting on the chamber top.

The domed top may include a curvature that may be equivalent to a surface of a sphere with a radius from 10 inches to 30 inches.

The curvature may be equivalent to a surface of a sphere with a radius of 20 inches.

The chamber top may include a transparent top section. The transparent top section may allow a user to look into the sight glass from above the sight glass.

The chamber top may be shaped such that the domed top may act as a magnifying glass.

The chamber bottom may include an angled chamber bottom. The angled chamber bottom may drain at least one of the first fluid and the second fluid.

The angled chamber bottom may include a bottom elevation difference of 0.05 inches.

The separator may include an overall density of greater than 800 kilograms per cubic meter and less than 1000 kilograms per cubic meter.

The separator may include a plurality of separators.

The plurality of separators may be of a number such that the plurality of separators may occupy a majority of the interface between the first fluid and the second fluid in the chamber.

The plurality of separators may include a plurality of spheres.

The chamber top may include a first opening defined in the chamber top. The chamber bottom may include a second opening defined in the chamber bottom. The second opening may be larger than the first opening. The separator may be sized such that the separator may pass through the second opening but may not pass through the first opening.

The separator may include a surface configured to prevent at least some bubbles from forming on the surface.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

The term "sight glass" should be interpreted to mean an apparatus allowing visual inspection of oil in the apparatus. The inclusion of the word "glass" should not place any limits on the components used in the manufacture of the apparatus. The apparatus may be made in whole or in part of glass, but the apparatus may additionally or alternatively be made of polymers, metals, or other materials. Additionally, while the term "oil sight glass" is utilized, the sight glass in various optional embodiments may be used with oil and water, but also may be used with a variety of other fluids as well. As used herein, "oil sight glass" and "sight glass" are understood to be interchangeable.

Figure 1A:
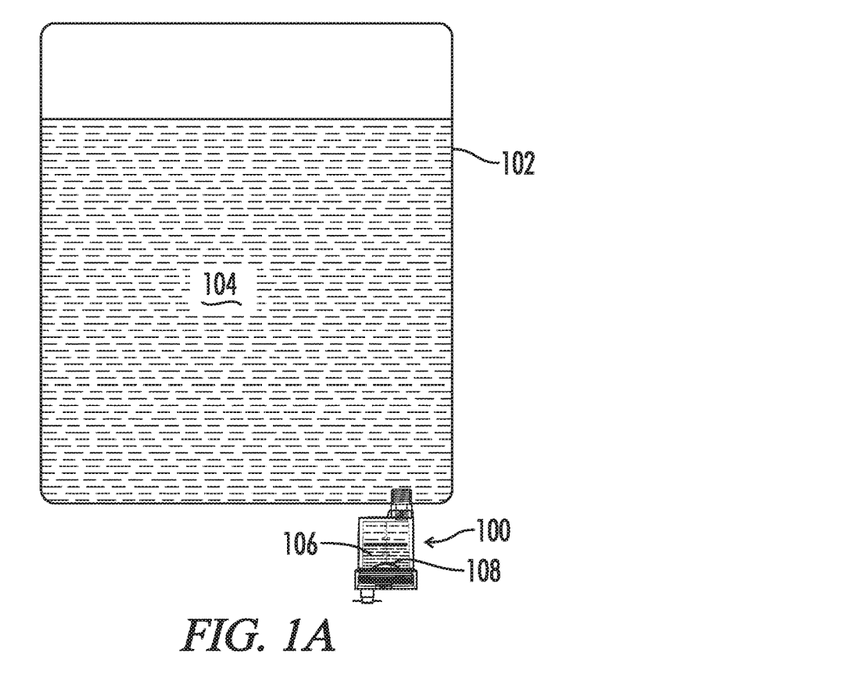
FIGS. 1a and 1b illustrate two exemplary embodiments of an oil sight glass apparatus attached to a corresponding reservoir.
Figure 1B:
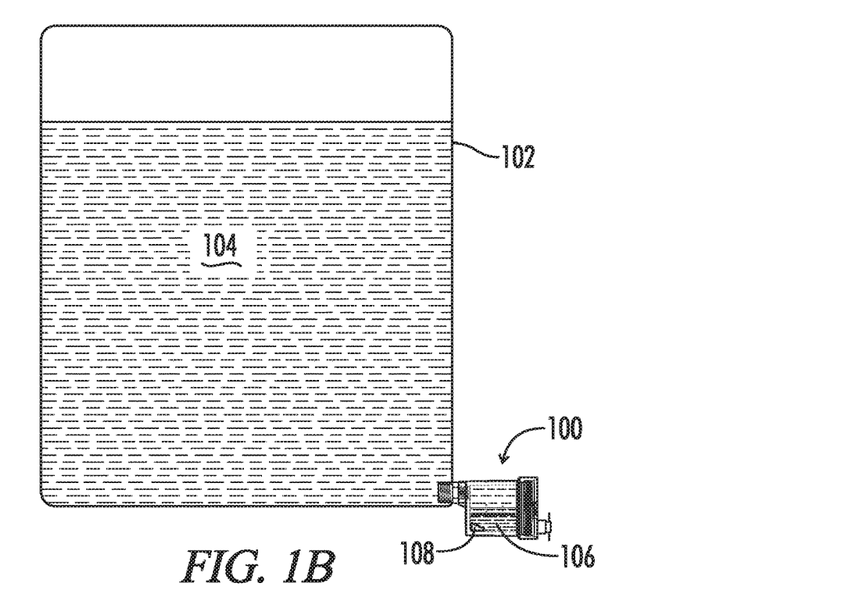

Referring to FIGS. 1a and 1b, an oil sight glass 100 may be installed on a corresponding reservoir 102 in a vertical orientation as illustrated in FIG. 1a or in a horizontal orientation as illustrated in FIG. 1b. Generally, sight glass 100 includes a see-through body for a user to be able to determine contaminant levels in the oil 104. Within sight glass 100, one may see oil 104, water 106, and/or sediment 108. As understood in the industry, sediment 108 may sometimes be quite difficult to see in the sight glass and may be harmful to corresponding equipment. Additionally, some oils 104 may include a color that makes it difficult for a user to distinguish between the oil and any water 106 present in the sight glass 100.

Figure 2:
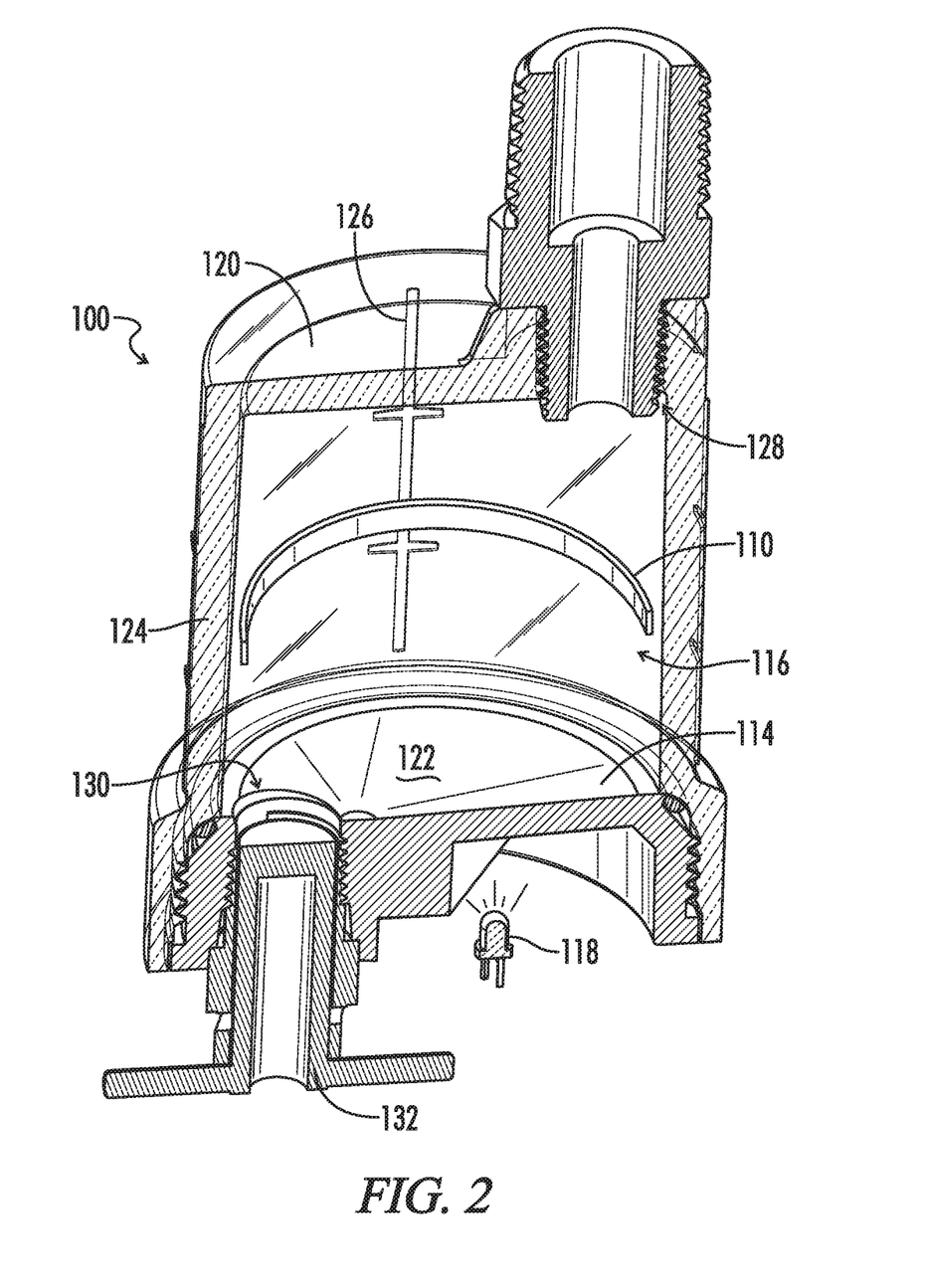
FIG. 2 is a cross-sectional view of an embodiment of the oil sight glass apparatus.

As shown in FIG. 2, the present disclosure relates to an oil sight glass apparatus 100. Some embodiments of the sight glass 100 may include an oil/water floating separator 110. As used herein "separator" refers to a structure that visually indicates the interface between a first fluid and a second fluid, typically oil and water. The separator 110 may be heavier than the oil 104 but lighter than the water 106 contained in the sight glass 100 such that the separator floats at the oil/water separation line. The separator 110 may be made of any appropriate material, but one embodiment may include the separator made of plastic with appropriate weights attached thereto. Other embodiments may include the separator 110 made of an appropriate metal of a size and shape that allows the separator to function without the addition of weights. Generally, embodiments often include one or more separators wherein the separator has a density of greater than about 800 and less than about 1000 kilograms per cubic meter. In optional embodiments, separator 110 may incorporate glass fibers for achieving the appropriate density of the separator. In further optional embodiments, different polymers may be used as the separator 110. For example, optional embodiments of separator 110 may include a separator formed from high density polyethylene (HDPE). In other optional embodiments, the separator 110 may be formed from polypropylene.

Figure 3:
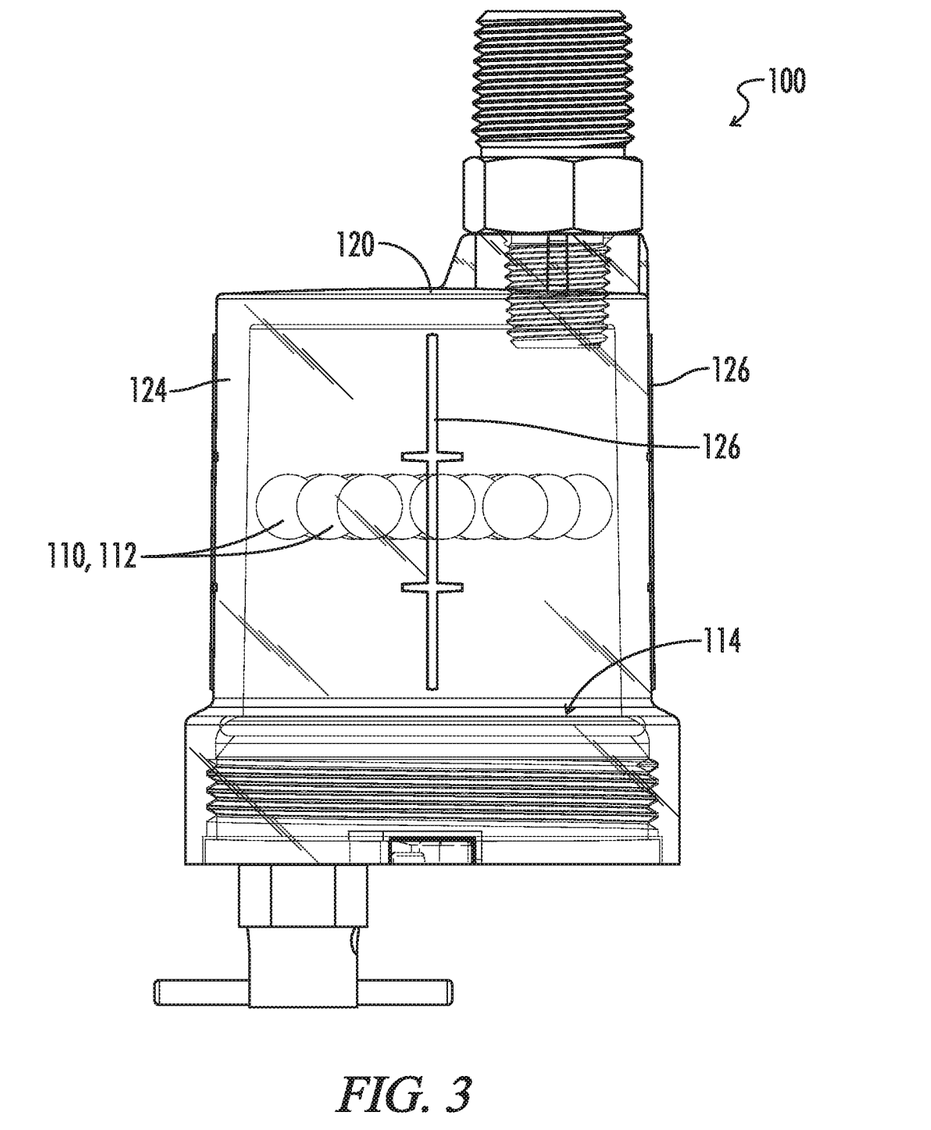
FIG. 3 is a side elevation view of another embodiment of the oil sight glass apparatus in a vertical orientation.
Figure 4:
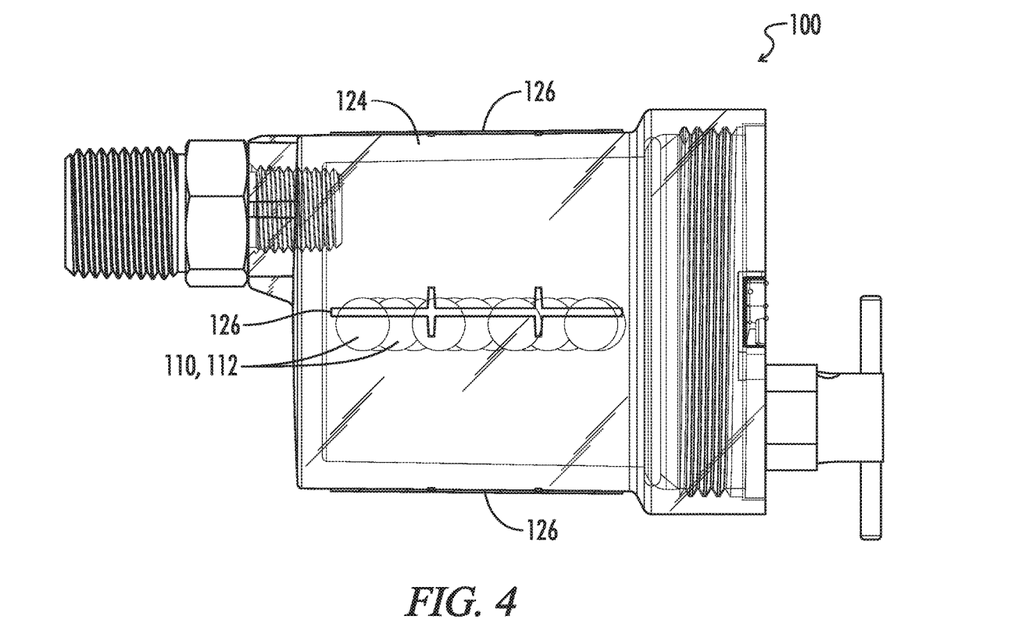
FIG. 4 is a side elevation view of the embodiment of the oil sight glass apparatus of FIG. 3 in the horizontal orientation.

The separator 110 may be sized and shaped such that it maintains an appropriate orientation in the chamber 116 of the sight glass 100 regardless of how the sight glass is handled. An operator may quickly ascertain whether water 106 is present in the sight glass 100 and how much water is present by utilizing the separator 110. Alternative embodiments of the sight glass 100 may include a plurality of oil/water separators 110. In some embodiments (shown in FIGS. 3 and 4), the plurality of oil/water separators 110 may include a plurality of spheres, or balls, or other shapes. In such embodiments, the spheres 112 may be small enough that the level of water 106 may be properly indicated regardless of the orientation of the sight glass 100. For instance, the sight glass 100 may be utilized in the vertical orientation, as shown in FIG. 3, or in the horizontal orientation, as shown in FIG. 4. The plurality of separators 110 may be of an appropriate number such that a majority of the visible meniscus line of the oil 104 and water 106 may be occupied. In use, the inclusion of the separator 110 will assist with providing improved visual information to the user about the occurrence of water within the system. Generally, the separators 110 need to be of a sufficient size to be quickly seen by the user. In instances where the separators 110 are of a smaller size, some embodiments include the use of separators 110 having a small enough size to fit within the second opening 130, but not the first opening 128. Advantageously, such optional embodiment allows for the use of separators, but reduces the likelihood of the separators 110 inadvertently entering the equipment to which the sight glass 100 is attached.

In further optional embodiments, the separator 110 may have a surface texture to reduce the occurrence of bubbles sticking to the separator. In instances where multiple separators 110 are used within sight glass 100, the separators 110 may have multiple angles so as to preclude the individual separators from becoming stuck within sight glass 100. This may include pointed protrusions as well as a polygonal exterior. In some optional embodiments, the separator 110 may have ridges, grooves, indentations, or the like to decrease the likelihood of a bubble or bubbles adhering to the surface of the separator 110. Other optional embodiments may include a surface treatment on the separator 110 to achieve a similar effect.

In addition, optional embodiments of the separator 110 may include high points on the separator. Such high points may decrease the surface area of the separator 110 in contact with the bottom or top (in a vertical orientation) of the oil sight glass 100. Otherwise stated, some optional embodiments of the separator 110 include a non-planar surface on at least one side of the separator 110, and optionally on both the bottom and top sides (in a vertical orientation) of a separator 100 within the oil sight glass 100. With such embodiments, the likelihood of the separator 110 adhering to either the internal top or bottom of the oil sight glass 100 is decreased.

Returning now to FIG. 2, the sight glass 100 may further include an opaque bottom 114. In some embodiments, the opaque bottom 114 may include an opaque white bottom. Any other appropriate colors are also considered to be within the scope of this disclosure. The opaque bottom 114 may allow ambient light to reflect upward into the chamber 116 of the oil sight glass 100. The bottom 114 may also allow at least some light to transmit upward into the chamber 116 from outside the chamber. Otherwise stated, while bottom 114 may be referred to in optional embodiments as opaque, bottom 114 may also be translucent. Because most sediment 108 and other contamination are dark, the additional visibility offered by the reflected and transmitted light may allow the user to more easily determine the amount and presence of any contamination. Such may better indicate the degree of contamination. A user may then more easily know when to take a sample of the oil 104 upon inspection of the oil sight glass 100. In further optional embodiments, an O-ring may be used with bottom 114. In some optional embodiments the O-ring may be black, but in other optional embodiments, the O-ring may advantageously be white. The use of a white O-ring may further allow one to have better visibility of contaminants in the sight glass 100 as such contaminants are generally dark.

In some optional embodiments, bottom 114 may be removable from sight glass 100. Generally, in such optional embodiments, bottom 114 may be screwed into the sidewall 124 of sight glass 100. In other optional embodiments it may snap into place or use other physical arrangements to attach to the rest of oil sight glass 100. Optional embodiments of oil sight glass 100 include second opening 130 in bottom 114. Second opening 130 in bottom 114 may include valve 132. In optional embodiments, valve 132 is threaded into second opening 130 and can allow a user to withdraw a sample from oil sight glass 100. In optional embodiments with valve 132, water and additionally contaminants may be withdrawn through valve 132. Other optional embodiments of second opening 130 include the use of a plug or screw insert rather than the valve 132 as illustrated. Additionally, in other optional embodiments, opening 130 may be threadless or alternatively opening valve 132 may be molded into bottom 114. Further optional embodiments include sidewall 124 extending down below bottom 114 which may assist in protecting bottom 114 from impact.

Alternative embodiments of the sight glass 100 may further include at least one light source 118 disposed nearer the bottom 114 than the top 120 of the sight glass. Some embodiments may include the light source 118 located below the bottom 114 of the sight glass 100. Some embodiments may include the light source 118 disposed within the bottom 114 of the sight glass such that the light source does not readily come into contact with any contaminants interior to or exterior to the sight glass 100. One embodiment of the light source 118 includes at least one light emitting diode. This additional light may allow for even more visibility of both sediment 108 and water 106 in the sight glass 100. The inclusion of at least one light source 118 may be particularly beneficial in dark locations and when the sight glass 100 may be difficult to access. The light source 118 may be turned on and off by a user from a remote location in some embodiments. Some embodiments utilizing the light source 118 may include at least a portion of the bottom 114 being clear or transparent instead of opaque. In such embodiments, the light source 118 may project light relatively uninhibited into the chamber 116 while the opaque sections of the bottom 114 may reflect any reflected light exiting the chamber back toward the chamber. In additional optional embodiments, bottom 114 may be a combination of translucent and clear.

Figure 5:
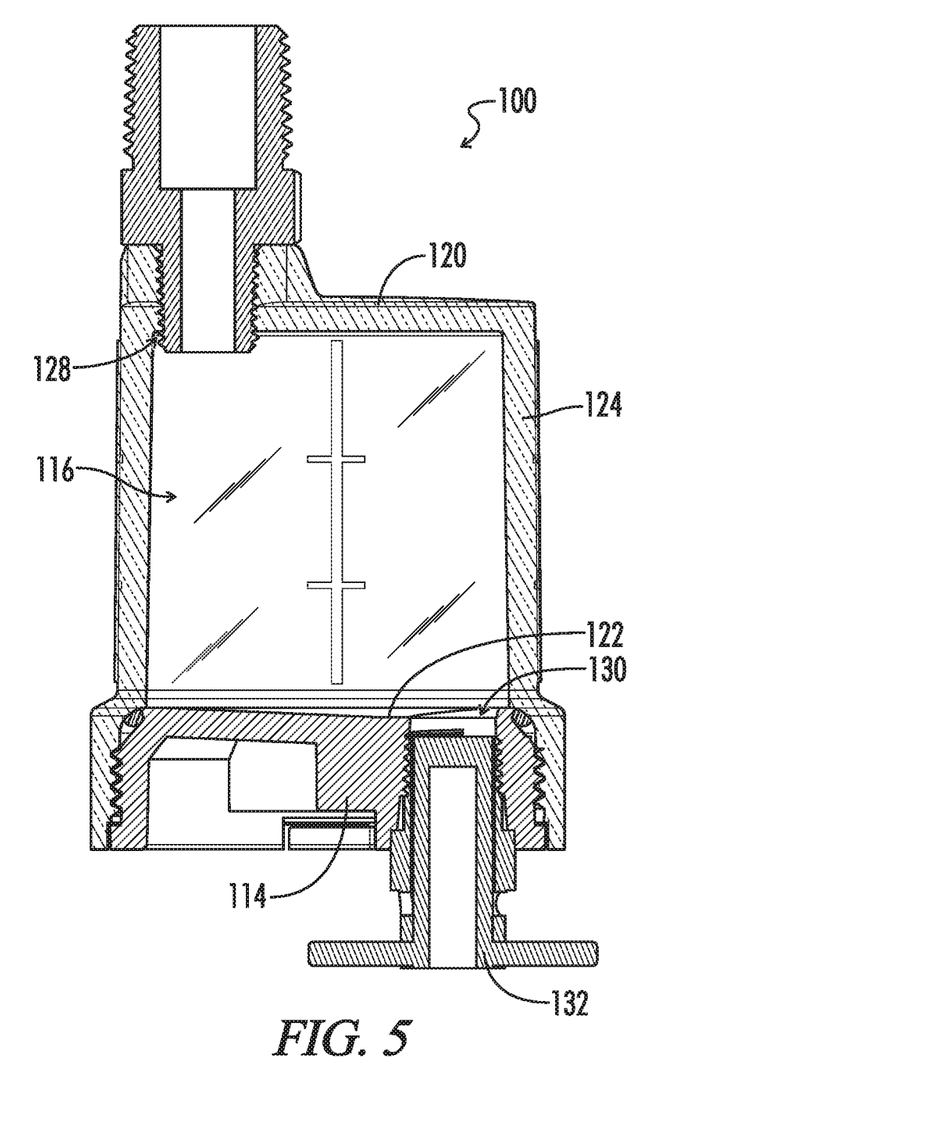
FIG. 5 is a cross-sectional view of various components of the oil sight glass apparatus of FIG. 2.
Figure 6:
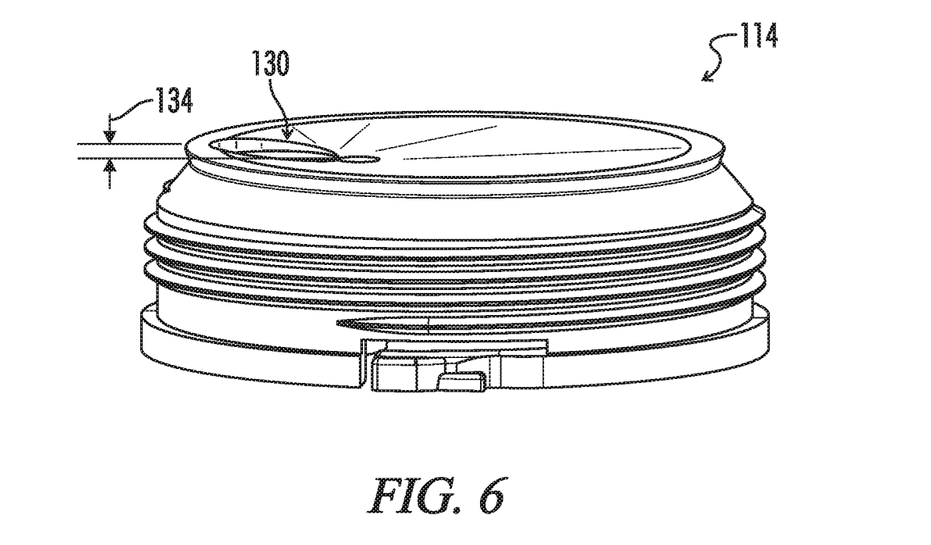
FIG. 6 is a perspective view of an embodiment of an optional bottom for the oil sight glass illustrating the elevation difference.

Turning now to FIGS. 2 and 5, the bottom 114 may include an angled bottom interior surface 122. The angled bottom interior surface 122 may aid in quickly and fully draining the sediment 108 and/or water 106. A user may also utilize the benefits of the angled bottom interior surface 122 to quickly sample the oil 104. The angled bottom interior surface 122 may be at any appropriate angle and may be a flat surface, curved surface, a plurality of channels, and the like. In some optional embodiments, the angle may be such that a high point is about 0.05 inches higher than a low point by opening 130 in bottom 114, though can be greater or less than 0.05 inches. This may be understood to be the bottom elevation difference and is indicated by numeral 134 in FIG. 6. In some options, bottom 114 may include a bathtub drain-styled interior surface angled toward opening 130. This allows either oil, or alternatively water or contaminants, to move toward opening 130.

Some embodiments of the sight glass 100 may also include a domed top 120. The domed top 120 may allow fluids and debris falling onto the top of the sight glass 100 to more easily roll off and may allow for easier washing of the sight glass. In further optional embodiments, the curvature of the domed top 120 may be equivalent to a surface of a sphere with about a 10-inch to about a 30-inch radius. In optional embodiments, the domed top surface has a curvature about equivalent to that of a surface of a sphere with a 20-inch radius. Such design may be useful for applications where oil sight glass 100 is used within the food industry. The decreased amount of exterior contamination may allow for higher visibility into the sight glass 100 even between cleanings. Advantageously, sight glass 100 may optionally include a transparent top surface 120 so that a user could more readily see contaminants in the sight glass 100. As often the sight glass will be at a low spot on machinery, a transparent top surface 120 allows a user better visibility to the internals of the sight glass 100. In some embodiments, the domed top 120 may also be configured to visually magnify the contents of the sight glass 100 such that a user may more readily view any sediment 108 or water 106 contained in the sight glass. The sight glass 100 may further be coated with an appropriate non-stick coating such that exterior contaminants may not easily be deposited on the sight glass and the sight glass may be more easily cleaned.

The sight glass 100 may also include a sidewall 124 connecting the bottom 114 and top 120. A graduated level indicator 126 may be disposed on or in the sidewall 124. A user may utilize the graduated level indicator 126 to aid in ascertaining the level of the sediment 108 and/or water 106 in the oil 104. The graduated level indicator 126 may be an indentation or a projection of the sidewall 124. Alternatively, the graduated level indicator 126 may be an insert fastened to the sidewall 124. In some embodiments, the graduated level indicator 126 may be illuminated by the at least one light source 118 more readily than the remainder of the sidewall 124 such that the indicator is easily visible. The sidewall 124 may further include at least one projection or groove to slidably receive a portion of the separator 110 such that the separator maintains its proper orientation during shipping or installation of the sight glass 100. In further optional embodiments, the sidewall 124 may include a lens or area which magnifies the interior of the sight glass 100. This may be fit to the sidewall 124 or alternatively be molded into the sidewall 124. Such could advantageously allow for a user to more readily see possible contaminants within the oil sight glass.

In further optional embodiments, the graduated level indicator may indicate certain volumes so a user may know what amount of water is in the system. Additionally, the graduated level indicator 126 may include cross marks at regular intervals which may optionally correspond to a volume. Advantageously, the graduated level indicator 126 may not only inform the user of possible water in the system, but may also help the user better observe a change in the amount of water in the system. In some optional embodiments, graduated level indicators 126 may be positioned directly across from one another. This aids in the dual mounting arrangement of oil sight glass 100.

Advantageously, optional embodiments of oil sight glass 100 permit it to be mounted in either a vertical or horizontal arrangement. With graduated level indicators 126, across from one another, such indicators may be useful in both a vertical or horizontal arrangement. Furthermore, first opening 128 and second opening 130 may be offset from one another. This may be advantageous as such arrangement allows for the sight glass 100 to be optionally oriented more underneath machinery, thus protecting the sight glass 100 and keeping it from being knocked. Furthermore, the offset arrangement of first opening 128 and second opening 130 may further provide for a less obstructed top surface when looking down upon the sight glass 100 when it is arranged in a vertical orientation. Additionally, in a horizontal orientation, having the second opening 130 located at a lower position than the first opening 128 further allows the user a greater opportunity to draw off water if such is within the system. Optional embodiments include an offset of from about half an inch to about an inch and a half.

In additional optional embodiments, various additions may be made to oil sight glass 100. For example, a magnet may be integrated within bottom 114 to trap and better maintain metal contaminants. Sensors may also be included to detect water or alternatively indicate the presence of a contaminant. Remote cameras could also be used to view the sight glass, especially in areas in which the sight glass 100 would be difficult to otherwise view.

This written description uses examples to disclose the invention and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although embodiments of the disclosure have been described using specific terms, such description is for illustrative purposes only. The words used are words of description rather than limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. While specific uses for the subject matter of the disclosure have been exemplified, other uses are contemplated. Therefore, the spirit and scope of the appended claims should not be limited to the description of the versions contained herein.

What is claimed is:

1. A sight glass comprising:
   a sight body;
   a chamber defined in the sight body, the chamber including a top, a bottom, and a sidewall spanning from the top to the bottom, wherein the top includes a first opening defined therein, the bottom includes a second opening defined therein, and the first opening and second opening are offset in relation to one another;
   a separator located in the chamber, the separator configured to float in a first fluid and sink in a second fluid such that the separator rests at an interface between the first fluid and the second fluid in the chamber; and
   wherein the sight glass is operable in a vertical and a horizontal orientation.

2. The sight glass of claim 1, wherein:
the chamber bottom includes an opaque bottom section such that at least some ambient light reflects off of the opaque bottom section and into the chamber.

3. The sight glass of claim 2, wherein:
a majority of the chamber bottom includes the opaque bottom section.

4. The sight glass of claim 1, further comprising:
an illumination source located nearer the chamber bottom than the chamber top.

5. The sight glass of claim 4, wherein:
the illumination source is located below the chamber bottom opposite the chamber top.

6. The sight glass of claim 4, wherein:
the illumination source is disposed at least partially within the chamber bottom.

7. The sight glass of claim 4, wherein:
the illumination source is electrically connected to a remote light switch.

8. The sight glass of claim 1, wherein:
the chamber top includes a domed top to prevent at least some exterior contaminants from resting on the chamber top.

9. The sight glass of claim 8, wherein:
the domed top includes a curvature that is equivalent to a surface of a sphere with a radius from 10 inches to 30 inches.

10. The sight glass of claim 9, wherein:
the curvature is equivalent to a surface of a sphere with a radius of 20 inches.

11. The sight glass of claim 8, wherein:
the chamber top includes a transparent top section to allow a user to look into the sight glass from above.

12. The sight glass of claim 11, wherein:
the chamber top is shaped such that the domed top acts as a magnifying glass.

13. The sight glass of claim 1, wherein:
the chamber bottom includes an angled chamber bottom to drain at least one of the first fluid and the second fluid.

14. The sight glass of claim 13, wherein:
the angled chamber bottom includes a bottom elevation difference of 0.05 inches.

15. The sight glass of claim 1, wherein:
the separator includes an overall density greater than 800 kilograms per cubic meter and less than 1000 kilograms per cubic meter.

16. The sight glass of claim 1, wherein:
the separator includes a plurality of separators.

17. The sight glass of claim 16, wherein:
the plurality of separators are of a number such that the plurality of separators occupies a majority of the interface between the first fluid and the second fluid in the chamber.

18. The sight glass of claim 16, wherein:
the plurality of separators includes a plurality of spheres.

19. The sight glass of claim 1, wherein:
the second opening is larger than the first opening and the separator is sized such that the separator may pass through the second opening but may not pass through the first opening.

20. The sight glass of claim 1, wherein:
the separator includes a surface configured to prevent at least some bubbles from forming on the surface.

* * * * *